United States Patent
Karve et al.

(10) Patent No.: US 11,407,442 B2
(45) Date of Patent: Aug. 9, 2022

(54) STEER-BY-WIRE SYSTEM

(71) Applicant: Steering Solutions IP Holding Corporation, Saginaw, MI (US)

(72) Inventors: Harshwardhan D. Karve, Commerce Township, MI (US); Tejas M. Varunjikar, Troy, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 484 days.

(21) Appl. No.: 16/527,774

(22) Filed: Jul. 31, 2019

(65) Prior Publication Data
US 2021/0031827 A1 Feb. 4, 2021

(51) Int. Cl.
*B62D 5/00* (2006.01)
*B62D 5/04* (2006.01)

(52) U.S. Cl.
CPC .......... *B62D 5/006* (2013.01); *B62D 5/0463* (2013.01); *B62D 5/0472* (2013.01)

(58) Field of Classification Search
CPC .... B62D 5/006; B62D 5/0472; B62D 5/0463; B62D 6/008; B62D 5/04; B62D 5/046; B62D 6/00; B62D 5/00
USPC .......................................................... 701/41
See application file for complete search history.

(56) References Cited

U.S. PATENT DOCUMENTS

| | | | |
|---|---|---|---|
| 8,249,777 B2* | 8/2012 | Greul | B62D 6/008 701/41 |
| 9,381,939 B2* | 7/2016 | Chai | B62D 15/021 |
| 10,099,720 B2* | 10/2018 | Ramanujam | B62D 6/02 |
| 2003/0146037 A1* | 8/2003 | Menjak | B62D 5/006 180/402 |
| 2004/0011585 A1* | 1/2004 | Menjak | B62D 5/006 180/402 |
| 2014/0039762 A1* | 2/2014 | D'Silva | B62D 6/008 701/42 |

* cited by examiner

*Primary Examiner* — Shardul D Patel
(74) *Attorney, Agent, or Firm* — Dickinson Wright PLLC

(57) ABSTRACT

A steer-by-wire system includes a transmission torque sensor, a handwheel position sensor, and a controller. The transmission torque sensor is configured to measure and output a transmission torque signal. The handwheel position sensor is configured to measure and output a handwheel position signal. The controller includes an angle-based load calculation submodule, a torque steer ratio calculation submodule, and a torque control module. The angle-based load calculation submodule is configured to transform the transmission torque signal and the handwheel position signal into an estimated second load value. The torque steer ratio calculation submodule is configured to transform the estimated second load value, a first load value indicative of roadwheel load including torque steer influence, and the transmission torque signal into a torque steer ratio. The torque control module is configured to transform the first load value, the handwheel position signal, and the torque steer ratio into a handwheel torque command signal.

19 Claims, 10 Drawing Sheets

STEER-BY-WIRE SYSTEM

BACKGROUND OF THE INVENTION

The present disclosure relates to steer-by-wire systems, and more particularly to a steer-by-wire system configured to mitigate torque steer.

For electric power steering (EPS) systems, asymmetric rack loading may occur upon torque steer events. Such torque steer event can cause unintended steering of a vehicle if a driver's hands are not clasped to the handwheel. Moreover, a driver may feel an unexpected effort, or pull, if the driver's hands are on the handwheel. Traditional torque steer mitigation software for EPS systems are known to use Tbar torque to estimate a torque steer gain, and then estimate a motor torque overlay from the torque steer gain for mitigation. Unfortunately, such a torque overlay can interfere with roadwheel position controllers of the EPS system.

Accordingly, it is desirable to develop a torque steer mitigation process that does not interfere with other EPS system components and/or processes.

SUMMARY OF THE INVENTION

In one embodiment of the invention a steer-by-wire system is provided. The system includes a transmission torque sensor configured to measure and output a transmission torque signal and a handwheel position sensor configured to measure and output a handwheel position signal. At least one controller is included which has an angle-based load calculation submodule configured to receive and transform the transmission torque signal and the handwheel position signal into an estimated second load value and a torque steer ratio calculation submodule configured to receive and transform the estimated second load value, a first load value indicative of roadwheel load including torque steer influence, and the transmission torque signal into a torque steer ratio. A torque control module is configured to receive and transform the first load value, the handwheel position signal, and the torque steer ratio into a handwheel torque command signal.

In another embodiment of the invention, a method of mitigating torque steer in a steer-by-wire system is provided. The method includes providing a first load value indicative of roadwheel load influenced by torque steer events to at least one processor and estimating a second load value based on a transmission torque signal and a handwheel position signal by the at least one processor. The method further includes calculating an excess force value indicative of a difference between the first load value and the estimated second load value, calculating a torque steer ratio for torque steer mitigation, as a function of at least a transmission torque value and the excess force value, and applying the torque steer ratio to a feel submodule executable by the processor and configured to, at least in-part, calculate a handwheel torque command signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
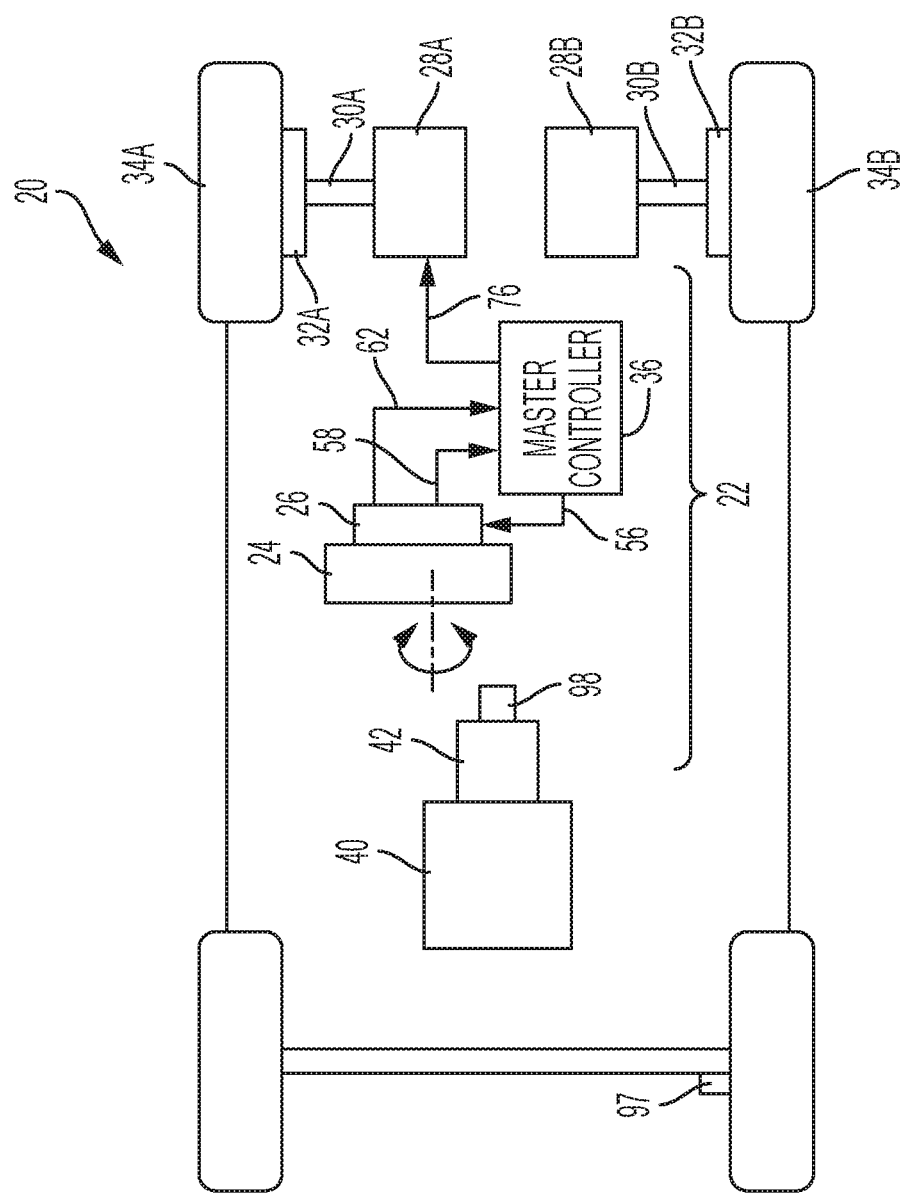
FIG. 1 is a schematic of a host vehicle utilizing a steer-by-wire system as one exemplary embodiment of the present disclosure.

Referring now to the Figures, where the invention will be described with reference to specific embodiments, without limiting same, a host vehicle 20 includes an embodiment of a steer-by-wire system 22, a handwheel 24 for steering the vehicle 20, left and right tie rods 30A, 30B, left and right knuckles 32A, 32B, left and right roadwheels 34A, 34B, a propulsion device 40 (e.g., combustion engine, electric motor, and others), and a transmission 42 coupled to the propulsion device 40. The roadwheels 34A, 34B are adapted to maneuver the vehicle 20 in a desired direction, and are coupled to the respective knuckles 32A, 32B. The knuckles 32A, 32B are coupled to the respective tie rods 30A, 30B. In one embodiment, the tie rods 32A, 32B are coupled electrically to the handwheel 24 via the steer-by-wire system 22.

In one embodiment, the steer-by-wire system 22 includes a handwheel control unit 26 coupled to the handwheel 24, roadwheel control units 28A, 28B coupled to the respective tie rods 30A, 30B and/or respective roadwheels 34A, 34B, and a master controller 36 configured to control the control units 26, 28A, 28B. In one example, the control units 26, 28A, 28B are generally 'smart actuators' having a degree of computer processing capability.

Figure 2:
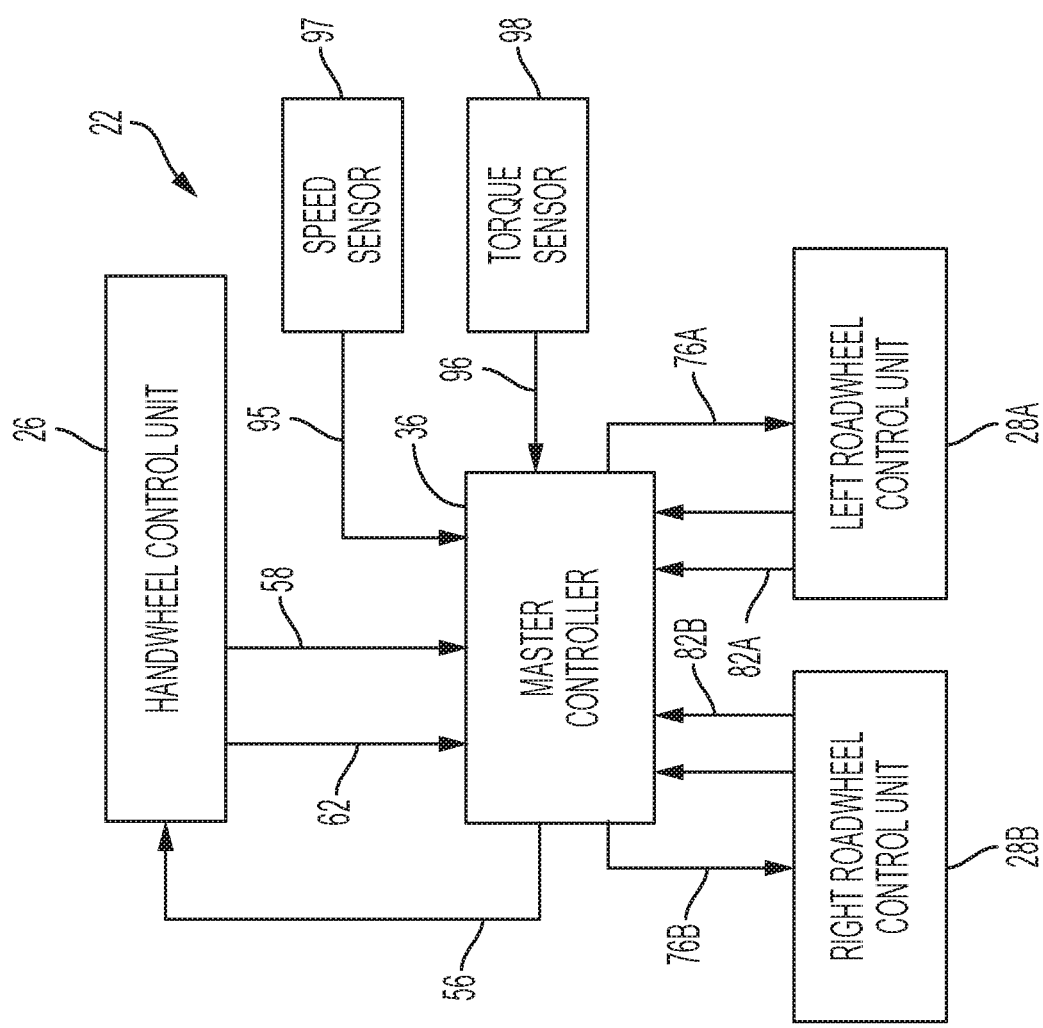
FIG. 2 is a block diagram of the steer-by-wire system.
Figure 3:
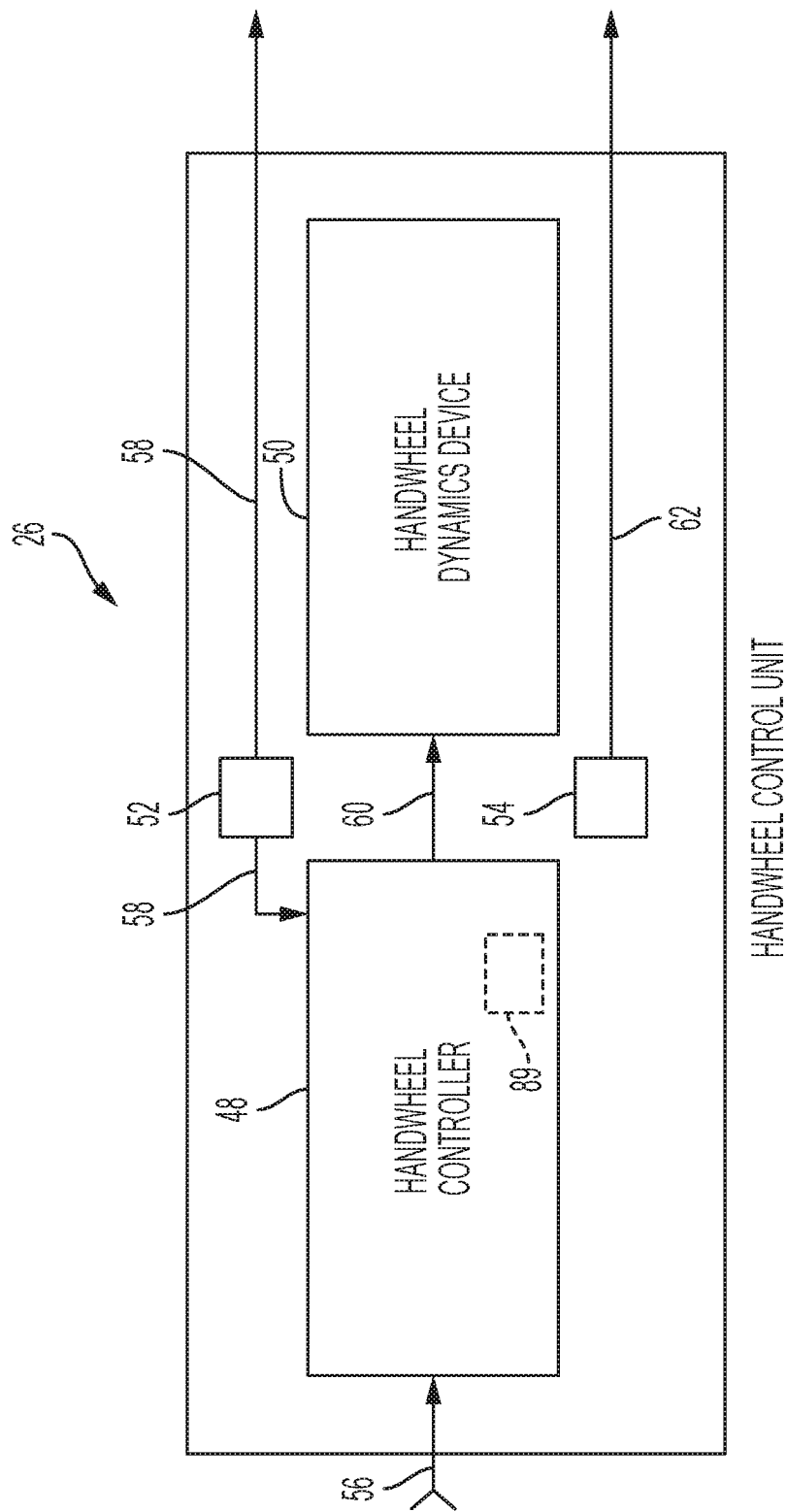
FIG. 3 is a block diagram of a handwheel control unit of the steer-by-wire system.

Handwheel Control Unit:

Referring to FIGS. 1, 2 and 3, and in one embodiment, the handwheel control unit 26 may include a handwheel controller 48, a handwheel dynamics device 50, a handwheel torque sensor 52, and a handwheel position sensor 54. In one example, the handwheel control unit 26 is a closed-loop control system that uses handwheel torque as a feedback signal. More specifically, the handwheel controller 48 of the handwheel control unit 26 is configured to receive a handwheel torque command signal (see arrow 56) from the master controller 36. The handwheel controller 48 compares the handwheel torque command signal 56 to a feedback torque signal 58 received from the handwheel torque sensor 52 of the handwheel control unit 26. For instance, one method of comparison is to simply subtract one signal from the other. A zero result indicates that the desired torque is being applied by the handwheel dynamics device 50 to the handwheel 24. With this comparison complete, the handwheel controller 48 utilizes the comparison to generate, and output, a reaction torque command signal 60 to the handwheel dynamics device 50 of the handwheel control unit 26 as needed to comply with the handwheel torque command signal 56 from the master controller 36.

The feedback torque signal 58 generated by the handwheel torque sensor 52 is indicative of the torque applied by the vehicle operator (i.e., driver). In one embodiment, the steering column (not shown) may include a torque bar (i.e., Tbar) as is known by one skilled in the art, and the torque sensor 52 is an integral part of the Tbar for measuring torque applied by the vehicle operator via the handwheel 24. In this embodiment, the handwheel torque may be referred to as a Tbar torque.

The handwheel dynamics device 50 includes the necessary elements to provide a reaction torque to the vehicle operator. The reaction torque is generally the torque felt by the vehicle operator as a resistance against rotation of the handwheel 24. This provides the vehicle operator with a simulated road feel when maneuvering the vehicle 20. In one embodiment, the handwheel dynamics device 50 includes, or is, an electric motor coupled to a steering column (not shown) or the handwheel 24. The reaction torque is imparted to the vehicle operator by the electric motor. Preferred reaction torque motors are those with reduced torque ripple, such as those describe in detail in commonly assigned U.S. Pat. No. 6,498,451, titled: Torque Ripple Free Electric Power Steering, issued Dec. 24, 2002, which is incorporated herein by reference in its entirety. With a torque ripple-free motor, the system 22 may not need to be a closed loop system on torque, provided the system employs motor control in current mode versus voltage mode. In another embodiment, the electric motor of the handwheel dynamics device 50 may not be a torque ripple-free motor. More specifically, current control of the reaction torque motor of the system 22 may be desired to minimize damping, though not required.

During operation of the handwheel control unit 26, the handwheel position sensor 54 detects the position and movement of the handwheel 24 and sends a handwheel position signal (see arrow 62) to the master controller 36.

Figure 4:
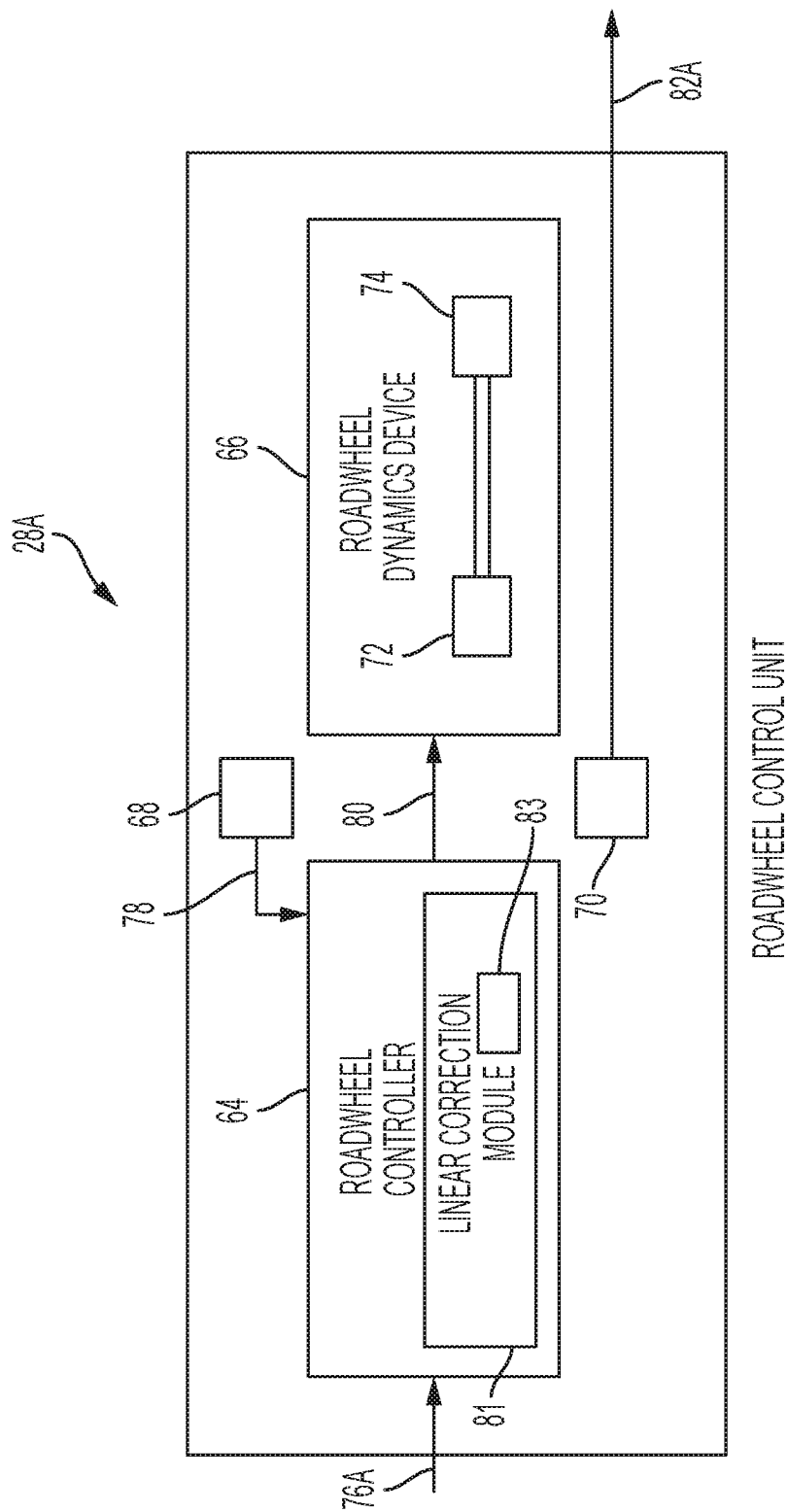
FIG. 4 is a block diagram of a roadwheel control unit of the steer-by-wire system.

Roadwheel Control Units:

Referring to FIGS. 1, 2, and 4, the roadwheel control units 28A, 28B (i.e., similar to the handwheel control unit 26) may be closed loop control systems, which use roadwheel position as a feedback signal. In the present example, there is a roadwheel control unit for each steerable roadwheel (e.g., roadwheels 34A, 34B). Each roadwheel control unit 28A, 28B includes a roadwheel controller 64, a roadwheel dynamics device 66, a position sensor 68 capable of generating signals indicative of roadwheel position, and a load sensor 70 (e.g., tie-rod sensor, or otherwise adapted to measure roadwheel load due to vehicle maneuvers). Although only one roadwheel control unit 28A is illustrated in FIG. 4, it is understood that the same components described as part of the roadwheel control unit 28A, exist for roadwheel control unit 28B and are associated with the corresponding tie rod 30B, knuckle 32B, and roadwheel 34B. It is contemplated and understood that the roadwheels control units 28A, 28B may utilize, or may otherwise be dependent upon, additional sensors and functions.

In one embodiment, the roadwheel dynamics device 66 of the roadwheel control unit 28A includes a direction positioning mechanism 72 and an electric motor 74 (see FIG. 4). The positioning mechanism 72 is coupled to the tie rods 30A for positioning the roadwheel 34A. The electric motor 74 is coupled to, and drives, the positioning mechanism 72. The motor 74 may be operated in either current or voltage mode provide sufficient stability margins are designed into the system (i.e., frequency based compensators).

The roadwheel controller 64 of the roadwheel control unit 28A is configured to receive a roadwheel command signal (see arrow 76A in FIGS. 2 and 4) from the master controller 36, and compares the roadwheel command signal 76A to a roadwheel position signal (see arrow 78) from the position sensor 68. Based on this comparison, the roadwheel controller 64 of the roadwheel control unit 28A outputs a roadwheel position command signal, or value, (see arrow 80) to the roadwheel dynamics device 66 to effect position displacement of the roadwheel 34A utilizing the positioning mechanism 72 and the electric motor 74. A zero result of the comparison indicates that the desired steering direction of the roadwheel 34A is achieved.

Similarly, the roadwheel controller 64 of the roadwheel control unit 28B is configured to receive a roadwheel command signal (see arrow 76B in FIG. 2) from the master controller 36, and compares the roadwheel command signal 76B to a roadwheel position signal (see arrow 78) from the position sensor 68 of the roadwheel control unit 28B. Based on this comparison, the roadwheel controller 64 of the roadwheel control unit 28B outputs a roadwheel position command signal 80 to the roadwheel dynamics device 66 to effect position displacement of the roadwheel 34B utilizing the positioning mechanism 72 and the electric motor 74. A zero result of the comparison indicates that the desired steering direction of the roadwheel 34B is achieved.

In one example, the roadwheel controllers 64 of the roadwheel control units 28A, 28B include a linear correction module 81 configured to transform the roadwheel command signals 76A, 76B into the roadwheel position command signal 80 as linear travel values for the respective left and right roadwheels 34A, 34B. The linear correction module 81 uses the given steering geometry of the host vehicle 20 to calculate a linear position in order to attain a desired rotational position. It is contemplated that these calculations may be compiled into a lookup table 83, or the like, to optimize controller performance. Similar to the master controller 36, the roadwheel controller 64 may include a processor and an electronic storage medium (not shown), with the lookup table 83 stored in the storage medium. Alternatively, the lookup table 83 may be stored in the storage medium 86 of the master controller 36.

In one embodiment, the steering load is estimated (i.e., load at rack or load of tie-rods) by measuring the electric motor speed (or torque) of each unit 28A&B, then using a stored table in the master controller In another embodiment, the load sensor 70 of the roadwheel control unit 28A is adapted to detect and measure the forces placed on the tie-rod 30A, and outputs a measured load value, or signal, (see arrow 82A in FIG. 4) representative of the measured load, to the master controller 36. As previously stated, the roadwheel control unit 28B is associated with the roadwheel 34B, and therefore includes a load sensor 70 adapted to send a measured load value 82B indicative of forces placed upon the tie-rod 30B (also see FIGS. 1 and 2).

Frequency-Based Compensators:

In one embodiment, the handwheel controller 48 of the handwheel control unit 26 and the roadwheel control units 28A, 28B may each be local loop systems, and thus may each include a frequency-based compensator 89 (see FIG. 3) configured to maintain stability of the respective handwheel dynamics device 50, and roadwheel dynamics devices 66. In one example, the frequency-based compensator 89 is used to provide stability of the steer-by-wire system 22 at sufficient gains to maintain bandwidth in the area of ten hertz (10 Hz). If any one of the handwheel control unit 26 and roadwheel control units 28A, 28B have a low bandwidth, the overall stability of the system 22 is reduced, and compensation on a higher level is needed.

Figure 5:
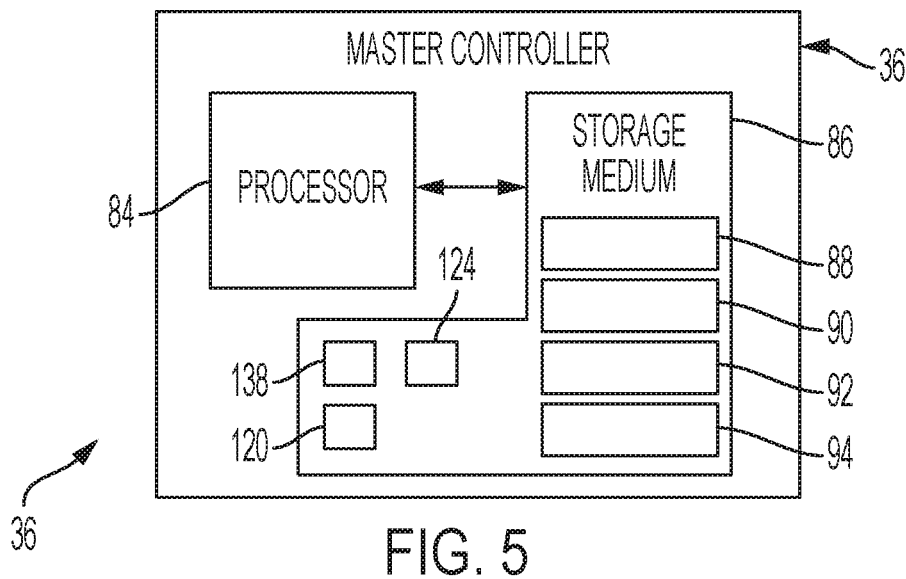
FIG. 5 is a block diagram of a master controller of the steer-by-wire system.
Figure 6:
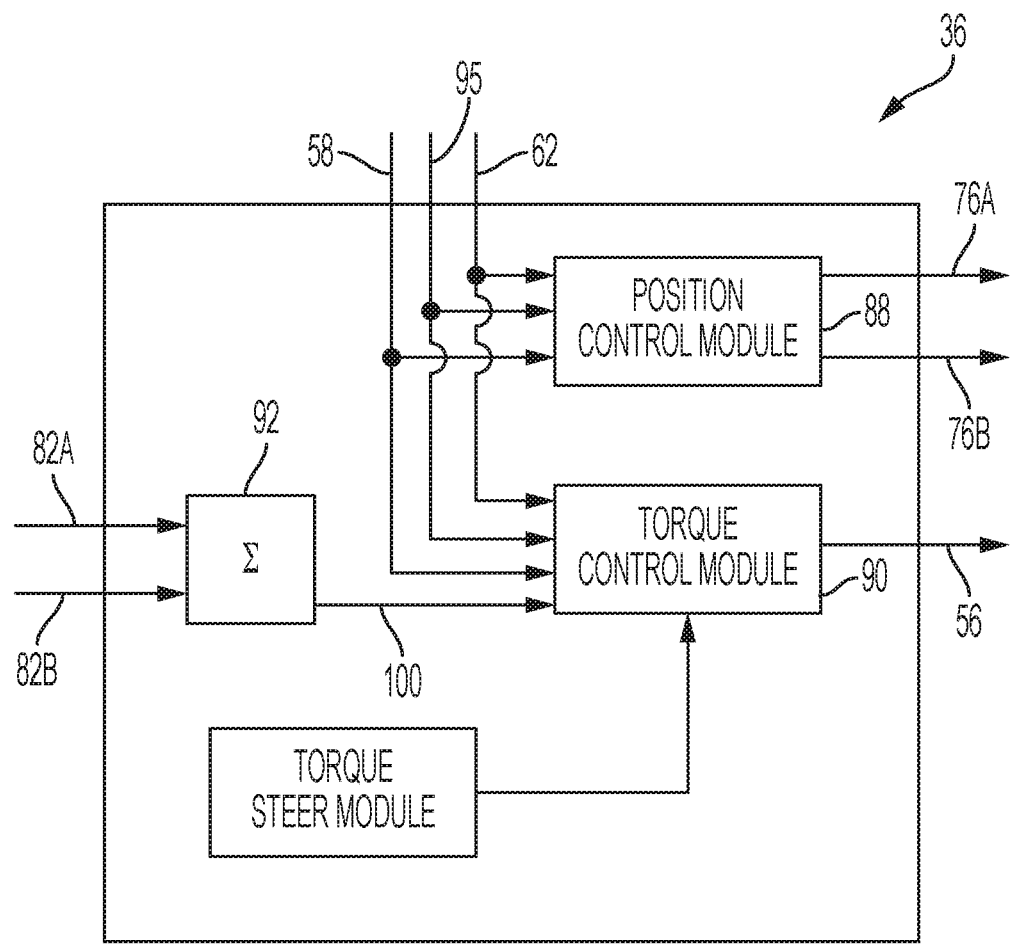
FIG. 6 is a schematic of the master controller.

Master Controller:

Referring to FIGS. 5 and 6, the master controller 36 includes at least one processor 84 (e.g., microprocessor), at least one electronic storage medium 86, a position control module 88, a torque control module 90, a torque summation module 92, and a torque steer module 94. In one embodiment, the modules 88, 90, 92, 94 are, or include, computer instructions stored in the storage medium 86 and executed by the processor 84. The processor 84 is configured to receive the feedback torque signal 58 from the handwheel torque sensor 52, the handwheel position signal 62 from the handwheel position sensor 54, two measured load values 82A, 82B from the respective load sensors 70 of the respective roadwheel control units 28A, 28B, a vehicle speed signal (see arrow 95 in FIG. 2) for a sensor 97 (see FIGS. 1 and 2), and a torque signal (see arrow 96 in FIG. 2) from a sensor 98 (see FIGS. 1 and 2) indicative of transmission torque, or engine output and transmission ratio, accelerator pedal position, drive shaft torque or some combination of all of these- or the equivalent, relative to the transmission 42.

In operation of the steer-by-wire system 22, the two measured load values 82A, 82B from the respective left and right roadwheel control units 28A, 28B are received by the master controller 36, and combined by the torque summation module 92 to generate a composite load value 100. Each of the tie-rod, measured, load values 82A, 82B are associated with an appropriate sign to emulate, or identify, the force that would be observed if both tie-rods were connected, as in a conventional rack based steering system. For example, in a vehicle turning maneuver, one roadwheel turns inward toward the vehicle 20, while the other roadwheel turns outward away from the vehicle 20. In this state, the loads are opposite on each tie-rod, one being in compression and the other in tension. Therefore, to properly determine the composite load value 100, the magnitudes of the measured load values 82A, 82B along with their signs are summed together. The composite load value 100 is then send to the torque control module 90. Although disclosed as a simple summation, the tie-rod, measured, load signal combination may be more sophisticated, and could include other additional sensors and/or parameters.

The composite load value 100 is sent from the torque summation module 92 and to the torque control module 90 of the master controller 36. The torque control module 90 performs several processes for generating the handwheel torque command signal 56. The processes utilize as inputs: the composite load value 100, the vehicle speed 96, the feedback torque signal 58, and the handwheel position signal 62, to generate the handwheel torque command signal 56 as an output. That is, the processes transform the value 100 and signals 96, 58, and 62 into the torque commend signal 56.

Figure 7:
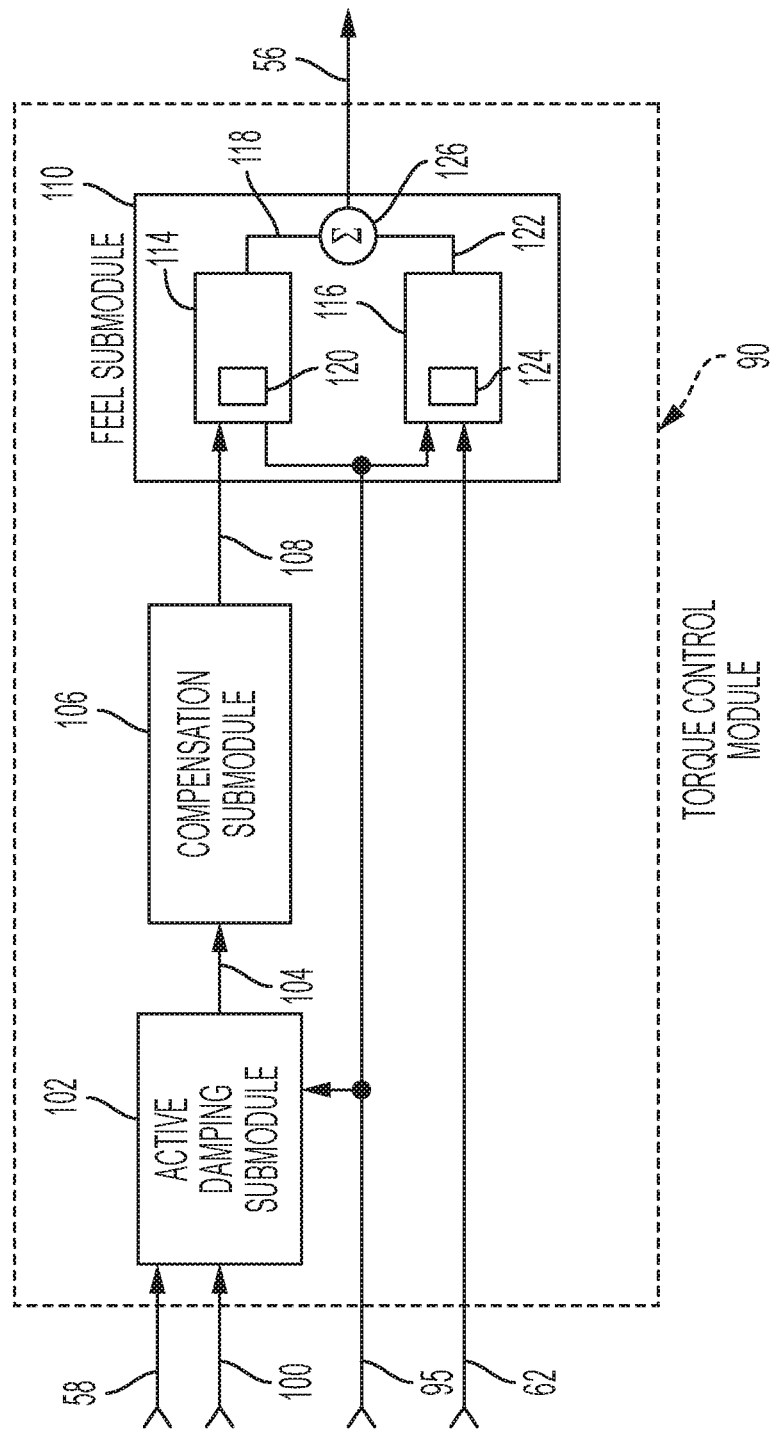
FIG. 7 is a schematic of a torque control module of the master controller.

Active Damping Process:

Referring to FIG. 7, one process generally performed by the torque control module 90 is an active damping process (identified as the active damping submodule 102). The active damping submodule 102 transforms the vehicle speed signal 95, the feedback torque signal 58, and the handwheel position signal 62 into a desired damping command, which is compared to the composite load value 100 to yield a damping torque command value 104. The active damping submodule 102 provides the opportunity to control the damping of the steer-by-wire system 22 dynamically as a function of vehicle operational parameters. In one embodiment, the active damping module 201 generates an increasing desired damping command value with increasing vehicle speed 28, decreasing handwheel torque as detected by the handwheel torque sensor, and increasing rate of change of handwheel position. The damping torque command value 104 is then sent to a compensation submodule 106 of the torque control module 90.

The compensation submodule 106 includes frequency based filtering to manipulate the spectral content of the damping torque command value 104 to ensure steer-by-wire system loop stability. Moreover, the compensation submodule 106 is configured to maintain system stability in the event the bandwidth of the control loops within the handwheel control unit 26, or roadwheel control units 28A, 28B, decrease. Also, the compensation submodule 106 is configured to manipulate the damping torque command value 104 to modify the spectral content of sensed road feedback to the vehicle operator. The compensation submodule 106 outputs a compensated torque command value 108 to a feel submodule 110 of the torque control module 90.

Feel Process:

The feel process (i.e., illustrated as the feel submodule 110 in FIG. 7), may include an assist submodule 112 and a return submodule 114 for generating the handwheel torque command signal 56. The assist submodule 112 generates an assist torque command value 118 as a function of vehicle speed. In one embodiment, the assist submodule 114 indexes the compensated torque command value 108 (i.e., initiated by the composite roadwheel value 100) into a set of one or more torque lookup tables 120 (see FIGS. 5 and 7) that yield the assist torque command value 118.

Where more than one torque lookup table 120 is used, the outputs are preferably blended based upon a ratio dependent upon the vehicle speed signal 95. For example, two lookup tables might be used, one for low speeds, and one for highway speeds. As the vehicle speed signal 95 increases, the table for highway speeds becomes increasingly dominant in the blend over the table for low speeds.

Generally, it can be desirable for the submodule 114 to provide increasing assist torque as a function of vehicle speed increases. Conventional systems, such as electric power steering systems, use the method of reducing the steering assisting force to allow the driver to feel more of the tire, or steering load. However, in a steer-by-wire system there is no direct mechanical link to the vehicle roadwheels 34A, 34B. Therefore, the commanded torque to the driver should actually be increased to cause the driver to feel more tire, or steering load.

The return submodule 116 of the feel submodule (steering feel) 110 generates a return to center torque command value 122 to drive the handwheel and the steer-by-wire system 22 to neutral, or center, under particular operating conditions based upon the current handwheel position signal 62, and the vehicle speed signal 95. Similar to the assist submodule 114, the return submodule 116 employs lookup tables 124 (see FIGS. 5 and 7), which in this case are indexed by the steering wheel position signal 62. In one embodiment, the return submodule 116 indexes the handwheel position signal 62 into a set of one, or more, torque lookup tables 124 yielding a return to center torque command value 122. Where more than one lookup table 124 is used, the outputs are preferably blended based upon a ratio dependent upon the vehicle speed signal 95. For example, two lookup tables 124 may be used, one for low speeds, and one for highway speeds. As the vehicle speed signal 95 increases, the lookup table 124 for highway speeds becomes increasingly dominant I the blend over the table for low speeds. Generally, it may be desirable for the return submodule 116 to provide increasing return torque as a function of vehicle speed increases. The final processing of the feel submodule 110 is to combine the assist torque commend value 118 and the return to center torque command value 122, thereby generating the handwheel torque command signal 56. In one example, the combination is achieved via a summation submodule 126 of the feel submodule 110.

It is appreciated that while the disclosed embodiments refer to a configuration utilizing the lookup tables 120, 124 in implementation, various alternatives will be apparent. For example, the submodules 144, 124, or processes, described above could employ in addition to (or in lieu of) lookup tables, direct algorithms, gain or parameter scheduling, or various other methodologies, which can facilitate execution of the desired functions.

Figure 8:
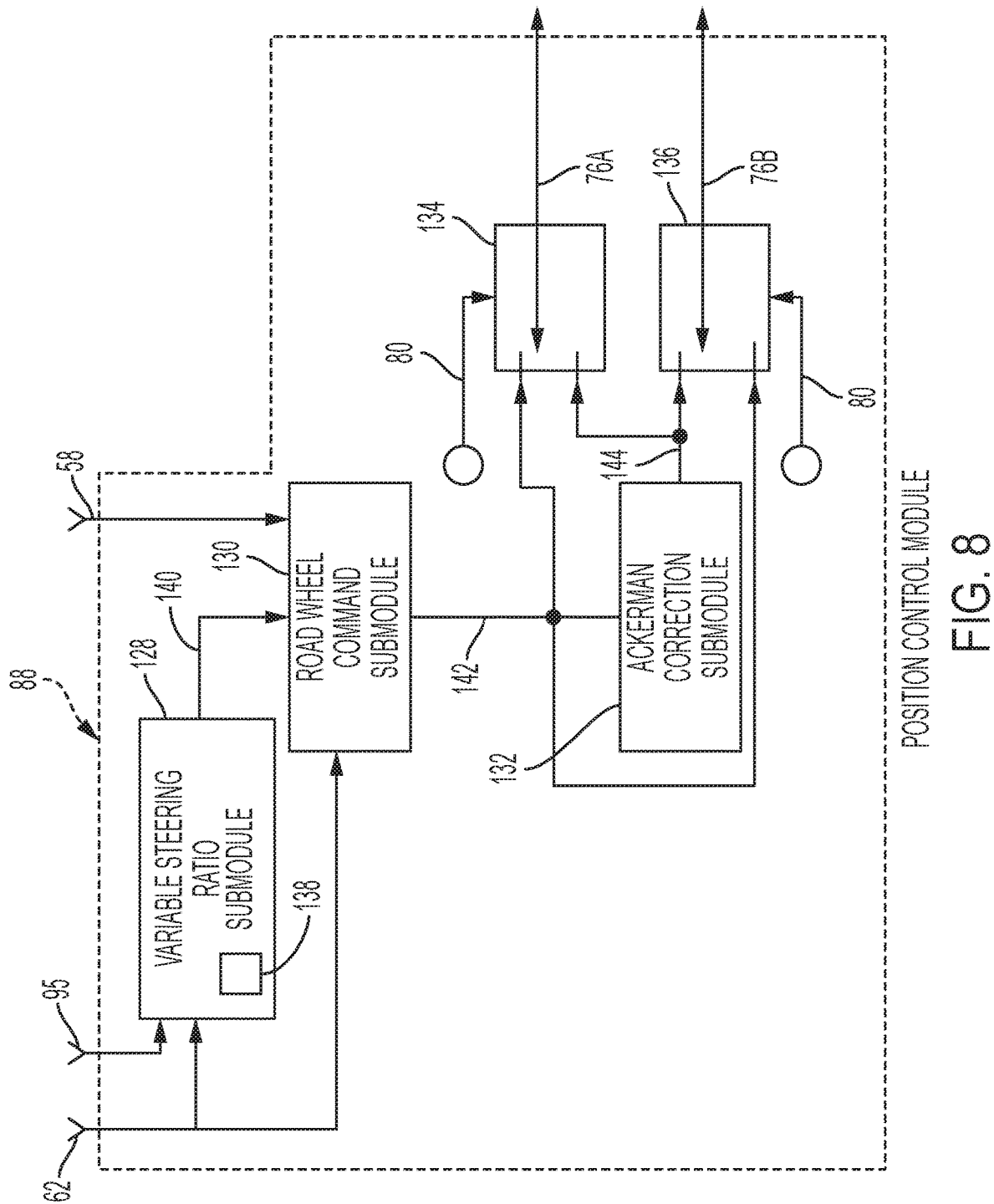
FIG. 8 is a schematic of a position control module of the master controller.

Position Control Module:

Referring to FIG. 8, the position control module 88 of the master controller 36 has several subcomponents, or processes, that are used in the calculation of the left and right roadwheel command signals 76A, 76B. For example, the position control module 88 includes a variable steering ratio submodule 128, a roadwheel command submodule 130, and a correction submodule 132 (e.g., Ackerman correction submodule), a left roadwheel switch 134, and a right roadwheel switch 136. The variable steering ratio submodule 128 receives the handwheel position signal 62 and the vehicle speed signal 95. The signals 62, 95 are then used as data points and applied when using a three-dimensional lookup table 138 that may be stored in the storage medium 86 of the master controller 36 (see FIGS. 5 and 8). Application of the signals 62, 95 to the lookup table 138 generates a variable steering ratio value, or signal (see arrow 140 in FIG. 8), that is then sent to the roadwheel command submodule 130.

The roadwheel command submodule 130 of the position control module 88 is configured to provide theta correction that corrects the commanded roadwheel position to reflect the actual position the handwheel 24 correctly. This is wanted for situations where the handwheel dynamics device 50 (e.g., reaction torque motor) of the handwheel control unit 26 moves to provide a reaction torque to the driver in response to a movement of the roadwheels 34A, 34B. However, the driver does not necessarily permit the handwheel 24 to turn, though he/she feels the reaction torque. The feedback torque signal 58 provides an effective, relative position measurement under the above-mentioned conditions. This relative position measurement is used by the roadwheel command module 88 to account for the motor-to-wheel difference and compensate the handwheel position signal 62 accordingly. The effect of the roadwheel moving without handwheel movement is undesirable so a theta correction is provided, and a theta-corrected road wheel command value, or signal, (see arrow 142) is generated and sent to the correction submodule 132.

The correction submodule 132 of the position control module 88 is configured to adjust roadwheel angles to correct for errors in the steering geometry. This correction enables each roadwheel to be steered in such a manner as to negotiate a curve along its natural rolling path. Though the correction submodule 132 is optional, it may be desirable because under normal turning conditions, the inner wheel tracks a smaller radius than the outer wheel in order for the vehicle to track a common turn center, thus the inner roadwheel needs to be steered at a greater angle.

In one embodiment, the correction submodule 132 transforms the theta-corrected roadwheel command value 142 into a refined, or Ackerman, corrected command value 144. The Ackerman corrected command value 144 is then sent to the left and right roadwheel switches 134, 136. The left and right roadwheel switches 134, 136 are each configured to select either the Ackerman corrected command value 144 or the theta-corrected roadwheel command value 142 in response to a sign value 146 representative of the sign of the theta-corrected roadwheel command value 144 to determine the respective left and right roadwheel command signals 76A, 76B. In this way, the Ackerman correction is applied to the appropriate roadwheel for a particular vehicle turning maneuver. The left and right roadwheel command signals 76A, 76B are then sent to the respective roadwheel control unit 28A, 28B (see FIG. 2). In other embodiments, the system 22 may be designed for use with a vehicle having one steerable roadwheel, or three or more steerable roadwheels. Yet further, the system 22 may include only one roadwheel control unit adapted to mechanically actuate a rack and pinion apparatus connected to two roadwheels.

The left and right roadwheel command signals 76A, 76B are representative of the desired road wheel angle. To apply this information effectively, the road wheel dynamics devices 66 of the respective roadwheel control units 28A, 28B uses this information, via the roadwheel position command signal 80 (see FIG. 4) representative of a linear value. Accordingly, the road wheel controller 64 of the respective roadwheel control units 28A, 28B may contain additional functionality. For example, the functionality may be shared between roadwheel controller 64 of the roadwheel control units 28A, 28B and the position control module 88 of the master controller 36.

Torque Steer:

Asymmetric loading between the roadwheel dynamic devices 66 of the roadwheel control units 28A, 28B (i.e., asymmetric rack loading) during acceleration causes "torque steer." Torque steer may cause, or contribute towards, unintended steering when driver's hands are off the handwheel 24, and/or unexpected effort (i.e., pull) when driver's hands are on the handwheel 24. Torque steer mitigation software uses Tbar torque (i.e., handwheel torque) measured by the handwheel torque sensor 52 to estimate torque steer gain, which is the proportion of transmission torque that appears as a rack force (i.e., force upon the roadwheel dynamic devices 66). After estimating the torque steer gain, a motor torque overlay is computed from the torque steer gain for torque steer mitigation. That is, the motor torque overlay is the additional motor torque needed from the handwheel dynamics device 50 (e.g., electric motor) to compensate for torque steer. The present invention limits, or prevents, the torque overlay from interfering with the roadwheel controllers 64.

Figure 9:
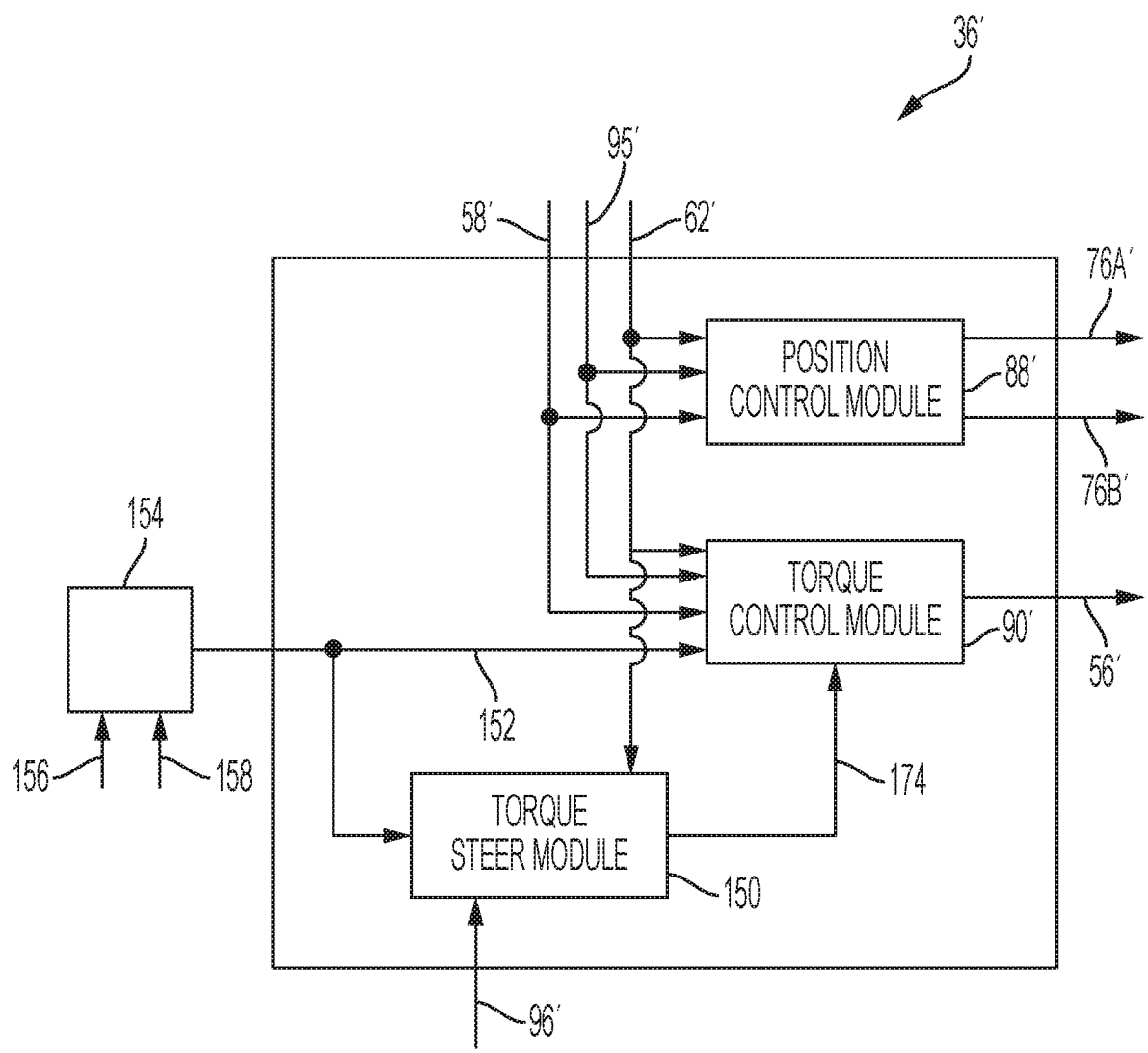
FIG. 9 is a schematic of a second embodiment of a master controller.

Referring to FIG. 9, a second embodiment of a master controller for a steer-by-wire system is illustrated, wherein like elements to the first embodiment have like identifying numerals except with the addition of a prime suffix. A master controller 36' includes a torque steer module 150. Unlike the master controller 36 of the first embodiment, a torque control module 90' of the controller 36' may not receive measured load signals indicative of, for example, steering rack load(s). Instead, the torque control module 90' receives an estimated first load value 152 from an electric power steering (EPS) observer module 154 that may be part of the master controller 36' or a controller of a remote roadwheel control unit. The estimated first load value 152 is analogous to the measured load values 82A, 82B, except that the estimated load value is not measured by torque sensor(s).

The EPS observer module 154 is configured to use motor current (see arrow 156) and motor velocity (see arrow 158) of the electric motor 74 of the roadwheel dynamics device 66 to calculate and output the first estimated load value 152 (e.g., rack force estimate). The estimated first load value 152 includes excess rack or tie-rod forces from torque steer and other events.

Figure 10:
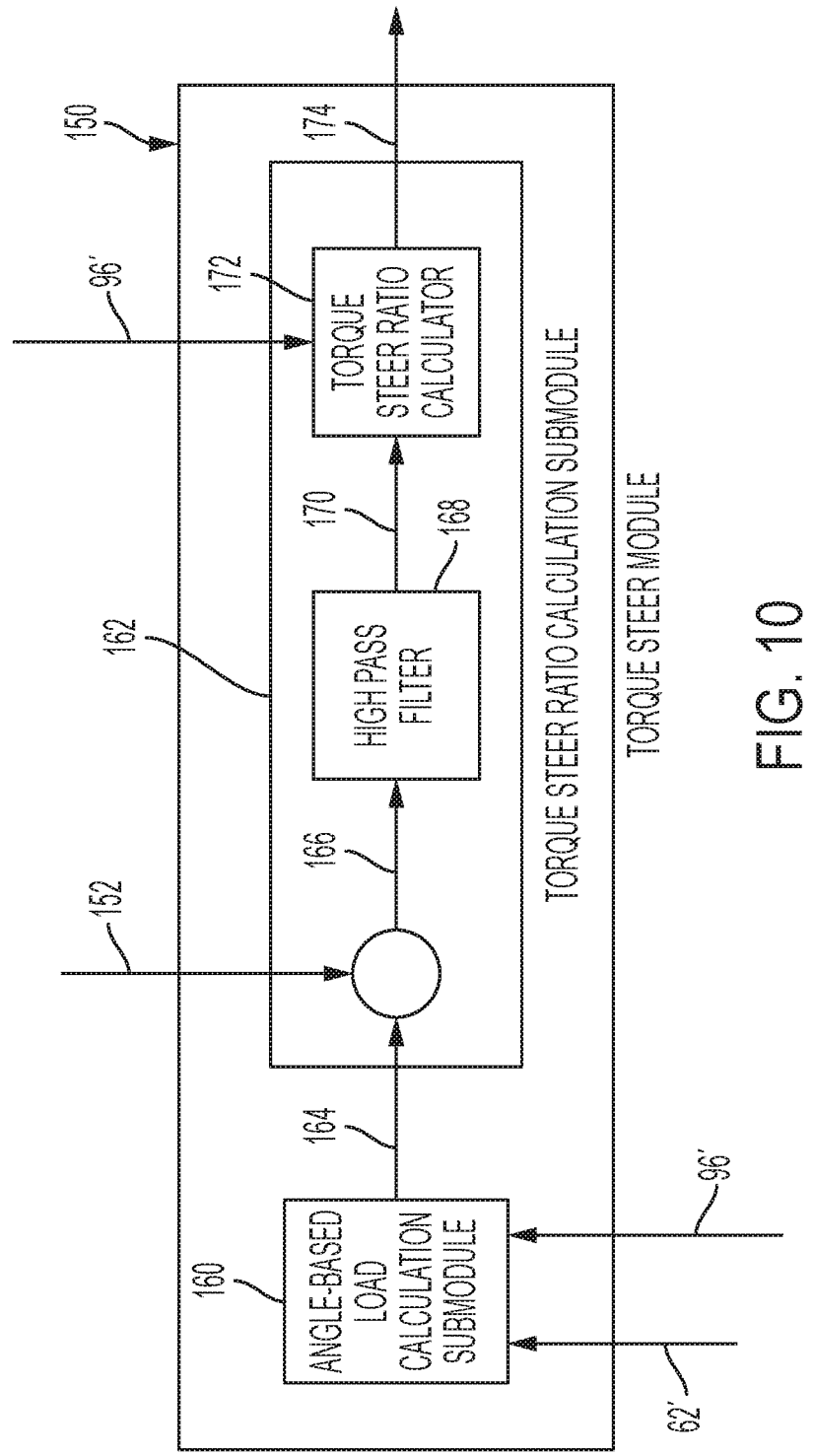
FIG. 10 is a schematic of a torque steer module of the master controller.

Referring to FIG. 10, and in the same embodiment as FIG. 9, the torque steer module 150 includes an angle-based load calculation submodule 160, and a torque steer ratio calculation submodule 162. The angle-based load calculation module 160 is configured to receive the handwheel position signal 62 from the position sensor 54, and the torque signal 96 from the torque sensor 98. From the signals 62, 96, the angle-based load calculation module 160 calculates and outputs a second estimated load value (see arrow 164).

The torque steer ratio calculation submodule 162 is configured to receive and compare the estimated first and second load values 152, 164 (i.e., subtract) to calculate an excess force signal, or value, (see arrow 166). The excess force value 166 is then passed through a high pass filter 168 of the torque steer ratio calculation submodule 162 to isolate any transient components. A resulting filtered excess force signal, or value, (see arrow 170) is then received by a torque steer ratio calculator 172 of the torque steer ratio calculation submodule 162. The torque steer ratio calculator 172 also receives the torque signal 96 (e.g., transmission torque signal), and is configured to divide the filtered excess force value 166 generally by the torque signal 96 to calculate and output a torque steer ratio (see arrow 174).

Figure 11:
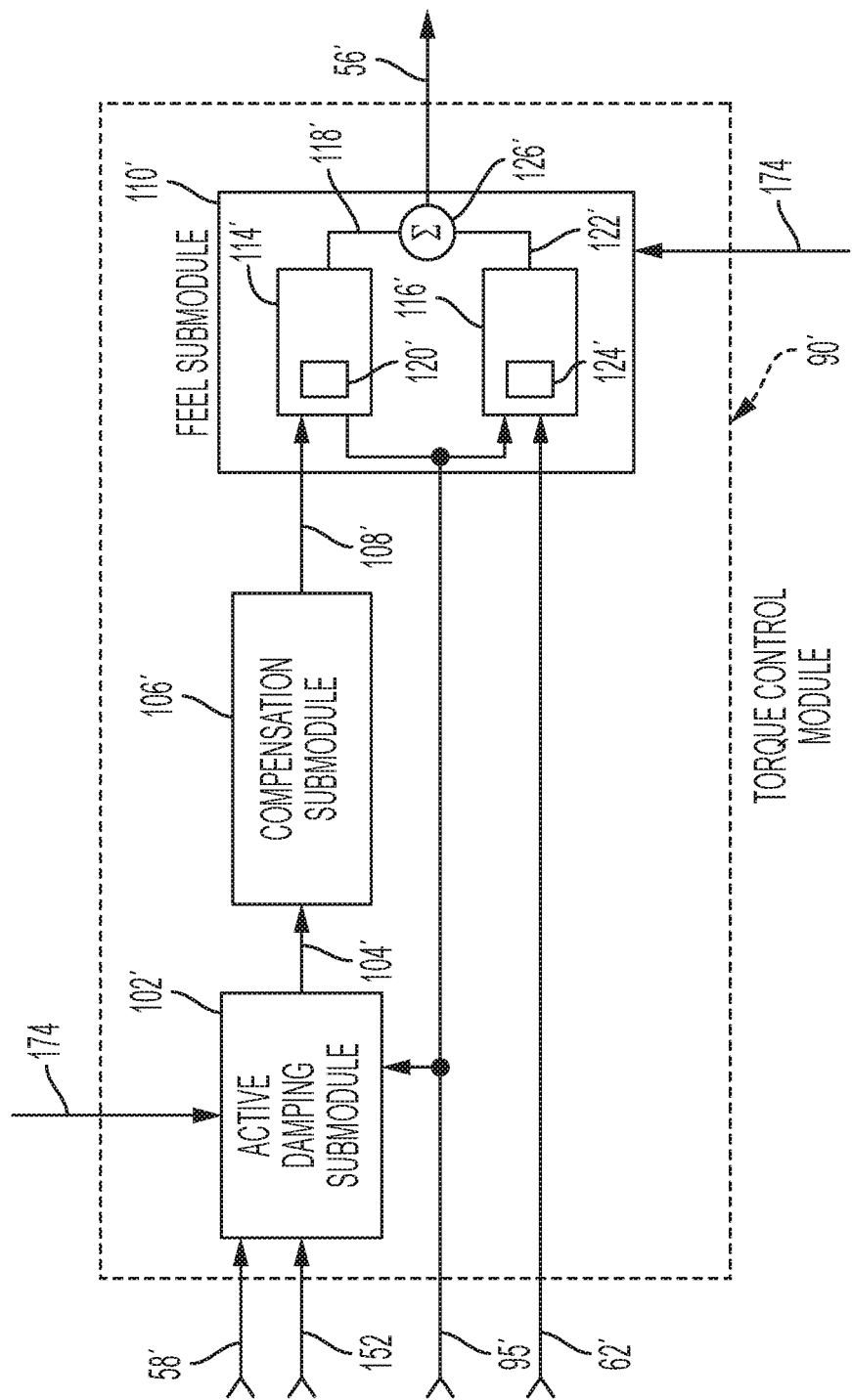
FIG. 11 is a schematic of a second embodiment of a torque control module of the master controller.

The torque steer ratio 174 may be applied to, or otherwise influences, the torque command signal 60 to modify the torque reference (i.e., that torque or effort felt by the driver). In one example and referring to FIG. 11, the torque steer ratio 174 is inputted to the active damping submodule 102' and the feel submodule 110' to ultimately refine the handwheel torque command signal 56', thus mitigating the effects of torque steer. It is further contemplated and understood that the torque steer ratio 174 may be applied to other handwheel torque reference functions that influence the handwheel torque command signal 56' for mitigating the effects of torque steer.

Benefits and advantages of the present disclosure include a system equipped to mitigate transient torque steer conditions. Furthermore, the system is directed to a steer-by-wire system, with or without a rack, that mitigates torque steer. The system includes a handwheel control unit configured to produce a reactive torque upon a steering wheel to provide the operator with an expected 'steering feel' while mitigating the unwanted effects of torque steer. In the present invention and if a rack is applied, the system may have only one roadwheel control unit with a motor that receives signals to steer the vehicle. In the second embodiment, there is no rack, thus each wheel has a dedicated roadwheel control unit. The handwheel control unit and the roadwheel control unit are both closed loop systems. Yet further, the present disclosure may be applied to systems that measure, or estimate, load values at pinion.

The disclosed invention may be embodied in the form of computer-implemented processes and apparatuses for practicing those processes. The present invention can also be embodied in the form of computer program code containing instructions embodied in tangible media, such as CD-ROMs, hard drives, or any other computer-readable storage medium, such that when the computer program code is loaded into and executed by a computer (i.e., processor), the computer becomes an apparatus for practicing the invention. The storage medium(s) may be non-transitory, and when the computer program code is implemented on a general-purpose processor (e.g., microprocessor), the computer program code, or segments thereof, configure the processor to create specific logic circuits.

Terms used herein such as component, application, module, submodule, system, and the like are intended to refer to a computer-related entity, either hardware, a combination of hardware and software, or software execution. By way of example, an application or module may be, but is not limited to, a process running on a processor, a processor, an object, an executable, a thread of execution, a program, and/or a computer. An application or module running on a server and the server, may be a component. One or more applications may reside within a process and/or thread of execution and an application or module may be localized on one computer and/or distributed between two or more computers.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steer-by-wire system comprising:
a transmission torque sensor configured to measure and output a transmission torque signal;
a handwheel position sensor configured to measure and output a handwheel position signal; and
at least one controller including,
an angle-based load calculation submodule configured to receive and transform the transmission torque signal and the handwheel position signal into an estimated second load value,
a torque steer ratio calculation submodule configured to receive and transform the estimated second load value, a first load value indicative of roadwheel load including torque steer influence, and the transmission torque signal into a torque steer ratio, and
a torque control module configured to receive and transform the first load value, the handwheel position signal, and the torque steer ratio into a handwheel torque command signal.

2. The steer-by-wire system set forth in claim 1, further comprising:
a handwheel control unit configured to receive the handwheel torque command signal to effect handwheel reaction.

3. The steer-by-wire system set forth in claim 2, wherein the handwheel control unit is closed loop and includes a handwheel torque sensor, handwheel controller, and a handwheel dynamics device, the handwheel controller being configured to receive the handwheel torque command signal, compare the handwheel torque command signal to a torque signal measured by the handwheel torque sensor and output a reaction torque command signal to the handwheel dynamics device.

4. The steer-by-wire system set forth in claim 1, further comprising:
at least one load sensor, and the first load value being measured by the at least one load sensor.

5. The steer-by-wire system set forth in claim 4, wherein the at least one load sensor includes two tie-rod load sensors.

6. The steer-by-wire system set forth in claim 1, further comprising:
a roadwheel direction positioning mechanism; and
an electric motor adapted to drive the roadwheel direction positioning mechanism, and the at least one controller including an electric power steering observer module configured to estimate the first load value from motor current and motor velocity associated with the electric motor.

7. The steer-by-wire system set forth in claim 6, wherein the torque steer ratio calculation submodule is configured to determine a difference between the first load value and the estimated second load value represented as an excess force value.

8. The steer-by-wire system set forth in claim 7, wherein the torque steer ratio calculation submodule includes a high pass filter configured to receive the excess force value to isolate transient components and output a filtered excess force value.

9. The steer-by-wire system set forth in claim 8, wherein the torque steer ratio calculation submodule includes a torque steer ratio calculator configured to receive and transform the excess force value and the transmission torque signal into the torque steer ratio.

10. The steer-by-wire system set forth in claim 1, wherein the torque control module includes a feel submodule configured to apply the torque steer ratio, and an active damping submodule configured to apply the torque steer ratio.

11. The steer-by-wire system set forth in claim 1, wherein the torque control module includes a feel submodule configured to receive and transform the vehicle speed signal, the handwheel position signal, the torque steer ratio, and a value at least directly associated with the first load value into the handwheel torque command signal.

12. A method of mitigating torque steer in a steer-by-wire system comprising:
providing a first load value indicative of roadwheel load influenced by torque steer events to at least one processor;
estimating a second load value based on a transmission torque signal and a handwheel position signal by the at least one processor;
calculating an excess force value indicative of a difference between the first load value and the estimated second load value;
calculating a torque steer ratio for torque steer mitigation, as a function of at least a transmission torque value and the excess force value; and
applying the torque steer ratio to a feel submodule executable by the processor and configured to at least in-part calculate a handwheel torque command signal.

13. The method of mitigating torque steer set forth in claim 12, further comprising:
applying the torque steer ratio to an active damping submodule executable by the processor and configured to in-part calculate the handwheel torque command signal.

14. The method of mitigating torque steer set forth in claim 12, further comprising:
sending the torque command signal to a handwheel control unit adapted to exert a reactive force upon a handwheel based on the torque command signal.

15. The method of mitigating torque steer set forth in claim 12, wherein the first load value is estimated and is a function of motor current and motor velocity of an electric motor of a roadwheel dynamics device.

16. The method of mitigating torque steer set forth in claim 12, wherein the first load value is measured by at least one load sensor of at least one roadwheel control unit.

17. The method of mitigating torque steer set forth in claim 16, wherein the at least one load sensor is at least one tie-rod load sensor.

18. The method of mitigating torque steer set forth in claim 12, wherein calculating the torque steer ratio includes generally dividing the excess force value by the transmission torque value.

19. The method of mitigating torque steer set forth in claim 12, further comprising:
filtering the excess force value by a high pass filter to produce a filtered excess force value, wherein the filtered excess force value is divided by the transmission torque value to calculate the torque steer ratio.

* * * * *